United States Patent
Payen et al.

(10) Patent No.: US 9,864,085 B2
(45) Date of Patent: *Jan. 9, 2018

(54) COMPACT BROADBAND SOURCE AND METHOD

(71) Applicant: CGGVeritas Services SA, Massy (FR)

(72) Inventors: Thierry Payen, Massy (FR); Robert Dowle, Massy (FR)

(73) Assignee: CGG Services SAS, Massy Cedex (FR)

( * ) Notice: Subject to any disclaimer, the term of this patent is extended or adjusted under 35 U.S.C. 154(b) by 291 days.

This patent is subject to a terminal disclaimer.

(21) Appl. No.: 14/724,955

(22) Filed: May 29, 2015

(65) Prior Publication Data

US 2015/0260869 A1 Sep. 17, 2015

Related U.S. Application Data

(63) Continuation of application No. 13/468,589, filed on May 10, 2012, now Pat. No. 9,075,166.

(60) Provisional application No. 61/484,816, filed on May 11, 2011.

(51) Int. Cl.
*G01V 1/38* (2006.01)
*G01V 1/137* (2006.01)

(52) U.S. Cl.
CPC ............ *G01V 1/3861* (2013.01); *G01V 1/137* (2013.01); *G01V 1/3817* (2013.01)

(58) Field of Classification Search
CPC .................................................. G01V 1/3861
USPC ........................................................ 367/16
See application file for complete search history.

(56) References Cited

U.S. PATENT DOCUMENTS

| 2,757,356 A | 7/1956 | Haggerty |
| 3,195,676 A | 7/1965 | Eisler et al. |
| 3,408,622 A | 10/1968 | Cox |
| 3,953,826 A | 4/1976 | Brundrit et al. |
| 4,136,754 A | 1/1979 | Manin |
| 4,254,480 A | 3/1981 | French |

(Continued)

FOREIGN PATENT DOCUMENTS

| GB | 760987 | 11/1956 |
| GB | 1193507 | 6/1970 |

(Continued)

OTHER PUBLICATIONS

Nick Moldoveanu; "Vertical Source Array in Marine Seismic Exploration"; Schlumberger; SEG 2000 Expanded Abstracts; [downloaded Feb. 2012]; pp. 1-5.

(Continued)

*Primary Examiner* — Mark Hellner
(74) *Attorney, Agent, or Firm* — Patent Portfolio Builders PLLC

(57) ABSTRACT

Method and marine acoustic source array for generating an acoustic wave in a body of water. The marine acoustic source array includes a first depth sub-array set of first acoustic source points configured to be provided at a first depth ($z1$), the first acoustic source points having different inline first locations along a longitudinal axis (X); and a second depth sub-array set of second acoustic source points configured to be provided at a second depth ($z2$), the second acoustic source points having different inline second locations along the longitudinal axis (X). The first locations do not coincide along the longitudinal axis (X) with any of the second locations.

20 Claims, 18 Drawing Sheets

(56) References Cited

U.S. PATENT DOCUMENTS

| | | | |
|---|---|---|---|
| 4,353,121 A | 10/1982 | Ray et al. | |
| 4,441,174 A | 4/1984 | Ray et al. | |
| 4,493,061 A | 1/1985 | Ray | |
| 4,497,044 A | 1/1985 | Silverman | |
| 4,644,507 A | 2/1987 | Ziolkowski | |
| 4,719,987 A | 1/1988 | George et al. | |
| 4,721,180 A | 1/1988 | Haughland et al. | |
| 4,727,956 A | 3/1988 | Huizer | |
| RE32,683 E | 5/1988 | Ray | |
| 4,956,822 A | 9/1990 | Barber et al. | |
| 5,111,437 A | 5/1992 | Rice | |
| 5,142,498 A | 8/1992 | Duren | |
| 5,142,898 A | 9/1992 | Kauschke et al. | |
| 5,144,588 A | 9/1992 | Johnston et al. | |
| 5,212,669 A | 5/1993 | Jenkins | |
| 5,281,773 A | 1/1994 | Duren | |
| 5,469,404 A | 11/1995 | Barber et al. | |
| 5,995,452 A | 11/1999 | Bouyoucus | |
| 6,091,668 A | 7/2000 | Barber, Sr. | |
| 6,493,636 B1 | 12/2002 | DeKok | |
| 6,961,284 B2 | 11/2005 | Moldoveanu | |
| 7,257,049 B1 | 8/2007 | Laws et al. | |
| 7,379,385 B2 | 5/2008 | Ferber | |
| 7,386,397 B2 | 6/2008 | Amundsen et al. | |
| 7,457,193 B2 | 11/2008 | Pramik | |
| 7,489,590 B2 | 2/2009 | Grion | |
| 7,679,991 B2 | 3/2010 | Ferber | |
| 7,774,142 B2 | 8/2010 | Amundsen et al. | |
| 7,948,825 B2 | 5/2011 | Moldoveanu | |
| 8,014,228 B2 | 9/2011 | Schreurs et al. | |
| 8,050,139 B2* | 11/2011 | Berstad | B63B 21/66 114/253 |
| 9,075,166 B2* | 7/2015 | Payen | G01V 1/3861 |
| 2003/0168277 A1 | 9/2003 | Hopperstad et al. | |
| 2003/0208320 A1 | 11/2003 | Zajac | |
| 2004/0136266 A1 | 7/2004 | Howlid et al. | |
| 2006/0209634 A1 | 9/2006 | Vigen | |
| 2006/0227660 A1 | 10/2006 | Grion | |
| 2008/0011540 A1 | 1/2008 | Moldoveanu | |
| 2008/0165618 A1 | 7/2008 | Robertsson | |
| 2009/0040873 A1 | 2/2009 | Schreurs et al. | |
| 2010/0008184 A1 | 1/2010 | Hegna et al. | |
| 2010/0008185 A1 | 1/2010 | Moldoveanu | |
| 2010/0142318 A1 | 6/2010 | Ferber | |
| 2010/0246323 A1 | 9/2010 | Berstad | |
| 2010/0254215 A1 | 10/2010 | Cambois | |
| 2011/0017543 A1 | 1/2011 | Hopperstad et al. | |
| 2011/0211422 A1 | 9/2011 | Moldoveanu | |
| 2011/0299360 A1 | 12/2011 | Lansley et al. | |
| 2011/0310700 A1 | 12/2011 | Robertsson et al. | |

FOREIGN PATENT DOCUMENTS

| | | |
|---|---|---|
| GB | 2148503 | 5/1985 |
| GB | 2176605 A | 12/1986 |
| WO | 01/16621 A1 | 3/2001 |
| WO | 2004044616 A1 | 5/2004 |
| WO | 2008073178 A2 | 6/2008 |
| WO | 2009005939 A1 | 1/2009 |
| WO | 2010027909 A2 | 3/2010 |
| WO | 2010/111377 A2 | 9/2010 |

OTHER PUBLICATIONS

Andrew Long, et al.; "A New Seismic Method to Significantly Improve Deeper Data Character and Interpretability";. IPA09-G-187; Proceedings, Indonesian Petroleum Association,; Thirty-Third Annual Convention & Exhibition; May 2009; pp. 1-5.

Petroleum Geo-Services, Tech Link; "GeoStreamer Quantification in Australia"; vol. 9, No. 1; Jan. 2009; pp. 1-4.

Petroleum Geo-Services Exploration; "920 cubic inch array ARRAYS 3 & 4"; Client: Petrobel; Job 60048; Area: South Belayim Concession; p. 1.

Mark Egan, et al.; "Full deghosting of OBC data with over/under source acquisition"; Schlumberger Western Geco; SEG/San Antonio 2007 Annual Meeting; pp. 31-35.

GB Search Report issued in related application No. GB 120794.3, dated Aug. 22, 2012.

GB Search Report dated Feb. 26, 2013 and issued in Application No. GB1207994.3.

British Examination Report dated Mar. 3, 2014, in related British Application No. GB1207994.3.

Cambois et al., "Multi-level Airgun Array—A simple Effective Way to Enhance Low Frequencies in Marine Seismic", Jun. 8-11, 2009, 71st EAGE Conference & Exhibition—Amsterdam, The Netherlands.

Smith, G., "Three Dimensional Air Gun Arrays", pp. 282-285, Dec. 2-6, 1984, Atlanta, Georgia, 54th Annual International Meeting, Society of Exploration Geophysicists, Expanded Abstract.

MX Office Action dated Nov. 26, 2014 in related Application No. MX/a/2012/005512.

* cited by examiner

COMPACT BROADBAND SOURCE AND METHOD

CROSS-REFERENCE TO RELATED APPLICATION

The present application is a continuation of U.S. patent application Ser. No. 13/468,589, filed May 10, 2012, entitled "Compact Broadband Source and Method", and is related to and claims the benefit of priority of U.S. Provisional Application Ser. No. 61/484,816, having the title "Compact Broadband Source and Method," and being authored by R. Dowle and T. Payen, the entire contents of which is incorporated herein by reference.

BACKGROUND

1. Technical Field

Embodiments of the subject matter disclosed herein generally relate to methods and systems related to seismic exploration and, more particularly, to mechanisms and techniques for providing a broadband seismic source.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the structures under the seafloor is an ongoing process.

During a seismic gathering process, as shown in FIG. 1, a vessel 10 tows an array of seismic receivers 11 provided on streamers 12. The streamers may be disposed horizontally, i.e., lying at a constant depth relative to a surface 14 of the ocean. The streamers may be disposed to have other spatial arrangements than horizontally. The vessel 10 also tows a seismic source array 16 that is configured to generate a seismic wave 18. The seismic wave 18 propagates downward, toward the seafloor 20, and penetrates the seafloor until eventually, a reflecting structure 22 (reflector), reflects the seismic wave. The reflected seismic wave 24 propagates upwardly until it is detected by the receiver 11 on streamer 12. Based on this data, an image of the subsurface is generated.

In an effort to improve the resolution of the subsurface's image, an innovative solution (BroadSeis) has been implemented based on broadband seismic data. BroadSeis may use Sentinel streamers (produced by Sercel) with low noise characteristics and the ability to deploy the streamers in configurations allowing the recording of an extra octave or more of low-frequencies. The streamers are designed to record seismic data while being towed at greater depths and are quieter than other streamers. Thus, the receivers of these streamers need a marine broadband source array.

Marine broadband source arrays may include plural source points provided along an X direction as shown in FIG. 2. Such a source array includes a float 30 that may be connected to a vessel (not shown) via a connection 32. The float 30 is configured to float at the surface of the water or near the surface of the water and to support plural source points 34. Source points 34 are suspended with appropriate cables 36 from the float 30 and also might be connected to each other by cables 38. An umbilical cable 40 may link one source point 34 to the vessel for providing a mechanical connection, and also electrical, pneumatic and/or communication cables. Source points 34 are typically provided at a same depth from a surface of the water.

One disadvantage of such a source array is that, depending on the type of survey, the size of the source array 16 is too large. Although FIG. 2 shows only three independent source points 34, a typical source array may have around 30 source points with the source points provided in sub-arrays, e.g., seven source points along a straight line. Reducing the length of the source array is not an easy task because by reducing the number of sources (e.g., airguns), the diversity of the source array is impacted, which sequentially reduces the quality of the source array and its tuning. Thus, simply reducing the number of source points to reduce the overall size of the source array is not a solution.

An alternate source array is discussed in WO 2009/005939, the entire content of which is incorporated herein by reference. This reference discloses using plural floats 40 floating at the surface 42 of the water as shown in FIG. 3. There are sub-arrays that include individual sources 44 provided at a first depth z1 and sub-arrays that include individual sources 46 provided at a second depth z2, larger than z1. However, such a configuration is still sizeable and necessitates a large number of floats.

Thus, the existing source arrays, due to their large size, have a large azimuthal footprint, i.e., not a good directionality. In order to obtain more precise images of the subsurface, it is desired that the source array is more omnidirectional, i.e., has a reduced azimuthal footprint. In other words, the illumination produced by the source needs to be more focused. This will extend the high-frequency energy spectrum, and will make this spectrum smoother. At the same time, it is desired to provide an economical and reliable airgun mechanical arrangement that is compatible with existing 3-dimensional seismic vessels.

Another problem that affects the conventional sources is "ghost reflections." Ghost reflections occur when upwardly travelling seismic energy is reflected or scattered downwards at the sea surface. The ghost reflections are also detected by the seismic receivers and generate notches in the recorded data. Various solutions have been proposed to address this matter but, at this time, no approach is highly effective. Accordingly, it would be desirable to provide systems and methods that provide a source array having a reduced footprint and improve the broadband characteristics of the recorded data.

SUMMARY

According to one exemplary embodiment, there is a marine acoustic source array for generating an acoustic wave in a body of water. The marine acoustic source array includes a float configured to float at or close to a surface of the body of water, wherein the float extends along a longitudinal axis (X); a first depth sub-array set configured to be suspended from the float at a first depth (z1), wherein the first depth sub-array set includes first acoustic source points, each suspended from the float at different first locations along the longitudinal axis (X); and a second depth sub-array set configured to be suspended from the same float at a second depth (z2), different from the first depth. The second depth sub-array set includes second acoustic source points, each suspended from the float at different second locations along the longitudinal axis (X). No first location shares a same value along the longitudinal axis (X) with any of the second locations.

According to another exemplary embodiment, there is a marine acoustic source array for generating an acoustic wave in a body of water. The marine acoustic source array includes a first depth sub-array set of first acoustic source points configured to be provided at a first depth (z1), the first acoustic source points having different inline first locations along a longitudinal axis (X); and a second depth sub-array set of second acoustic source points configured to be provided at a second depth (z2). The second acoustic source points has different inline second locations along the longitudinal axis (X). The first locations do not coincide along the longitudinal axis (X) with any of the second locations.

According to still another exemplary embodiment, there is a method for towing a marine acoustic source array for generating an acoustic wave in a body of water. The method includes deploying a float configured to float at or close to a surface of the body of water; towing a first depth sub-array set having first acoustic source points configured to be suspended from the float at a first depth; and towing a second depth sub-array set having second acoustic source points configured to be suspended from the same float at a second depth, different from the first depth. At least a source point of the second acoustic source points is configured to hang directly from a source point of the first acoustic source points at a predetermined distance so that acoustic waves emitted by these two source points do not coalesce.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a compact source array being towed by a vessel. However, the embodiments to be discussed next are not limited to this array, but may be applied to other seismic sources that are not necessary compact.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 4:
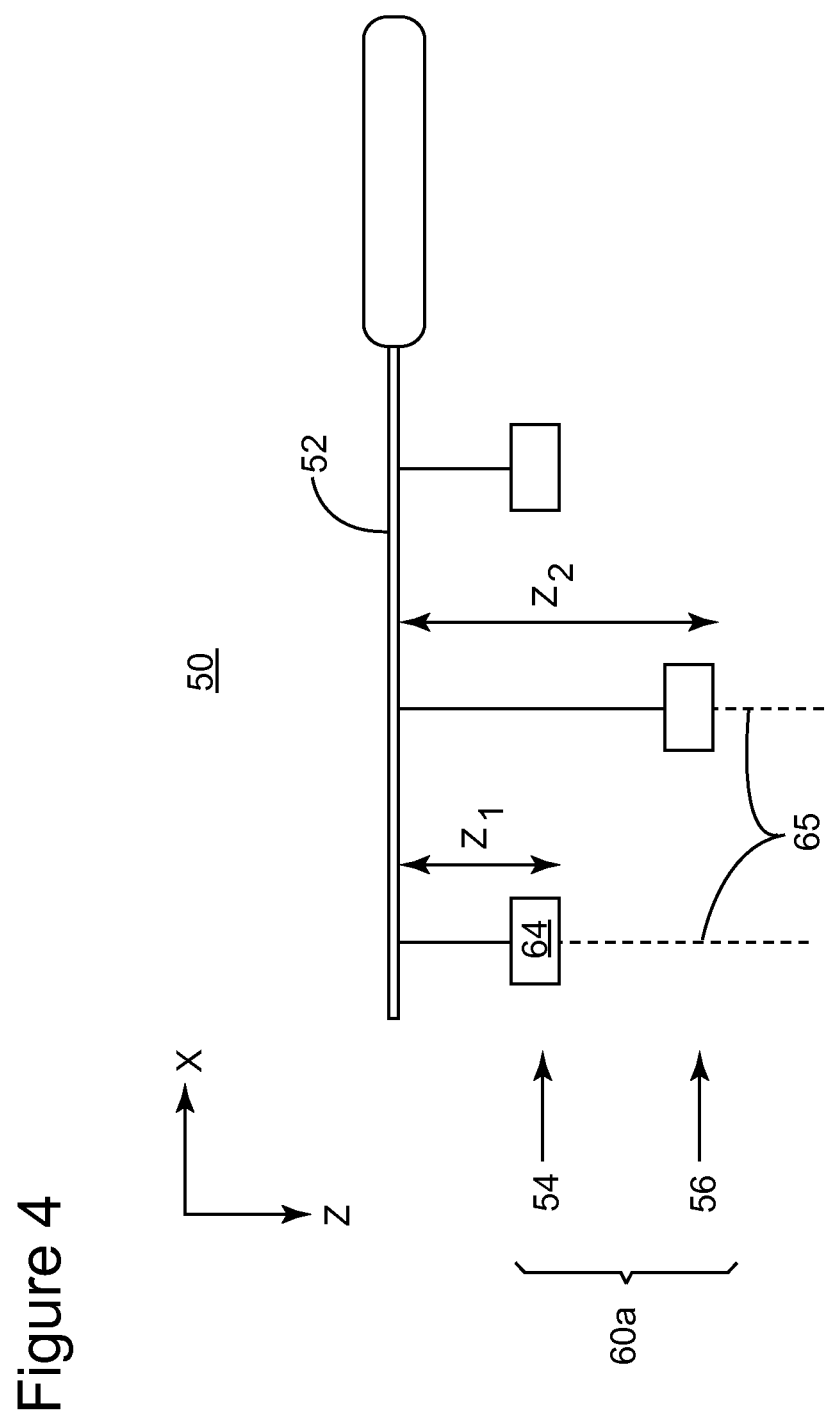
FIG. 4 is a schematic diagram of a float connected to two sets of sources distributed at two different depths according to an exemplary embodiment.
Figure 5:
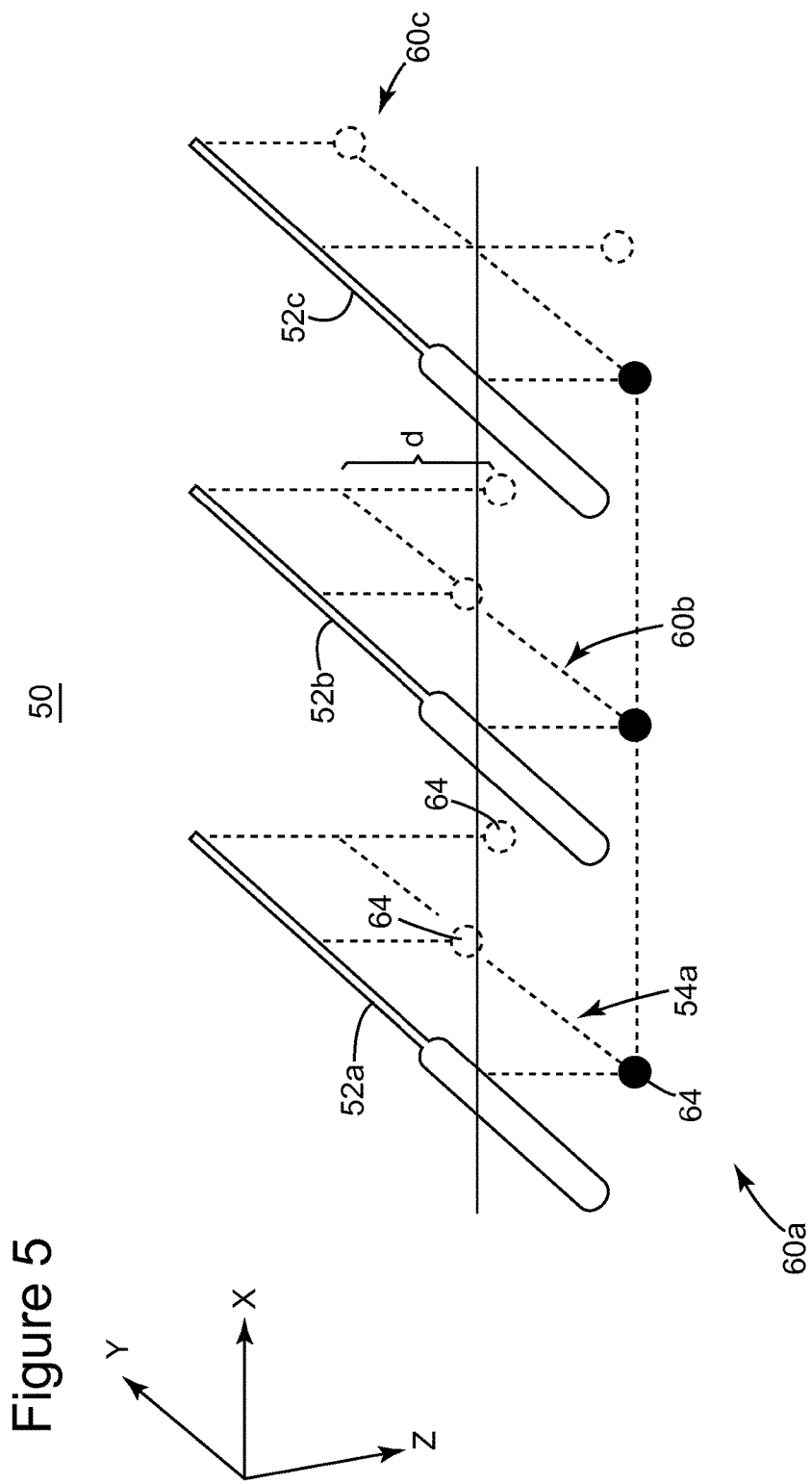
FIG. 5 is an overall view of plural floats each having two sets of sources distributed at two different depths according to an exemplary embodiment.

Emerging technologies in marine seismic surveys need a source array that is compact, preserve the number of independent sources (e.g., gun, vibration source, etc.) in order to have a good gun volume diversity, and achieve a superior suppression of the notches in the source amplitude spectrum. Such a source array was developed by the present inventors and is schematically illustrated in FIGS. 4 and 5. The source array 50 includes plural sub-arrays 60a to 60c (three for example in FIG. 5). Each sub-array includes plural individual sources 64. An individual source 64 is considered to include either a single source point, e.g., an airgun, or a predetermined number of single source points provided (coupled) together in such a way to generate a single seismic wave. The source points of a single sub-array, e.g., sub-array 60a, may be provided at different depths relative to a float 52. FIG. 4 shows a side view of such a sub-array 60a having at least a float 52 to which a first depth sub-array set 54 and a second depth sub-array set 56 are connected. Each sub-array set may include one or more source points. For example, if a traditional sub-array has seven source points provided at the same depth, a novel sub-array may have the same number of source points but five of them are provided at a first depth (the first depth sub-array set) and the remaining two are provided at a second depth (the second depth sub-array set). In this way, the novel source array is more compact along a direction X (inline) than the traditional source arrays.

Thus, plural sub-array sets suspended from the same float form a source sub-array. A vessel may tow plural source sub-arrays. For example, FIG. 4 shows a single source sub-array including two source sub-array sets. Each of the source sub-array set may include multiple independent sources. The first sub-array set is provided at a first depth z1 while the second sub-array set is provided at a second depth z2, different from z2. In one exemplary embodiment, the individual sources 64 are distributed so that no individual source from the first sub-array set is on a same vertical line 65 with an individual source from the second sub-array set.

The source array 50 reduces a length of the entire array along the X axis because the sources are distributed at various levels, reduces a length along the Y axis as a single float for a source sub-array set is used, and also reduces the ghost effect by having the independent source points distributed at different depths. While FIG. 4 shows the source points 64 provided at only two different depths, it is noted that the source points 64 may be provided at more than two depths. Also, FIG. 4 is not intended to show the exact number of source points as this number may vary depending on the survey. Also, FIG. 4 is not intended to show the exact distribution of the sources. However, in one embodiment, the number of source points of the source array 50 is between 20 and 40. More specifically, in one exemplary embodiment, 7 source points 64 may be provided for each float, 5 source points at depth z1 and 2 source points at depth z2. Such an exemplary set up may have three sub-arrays, each having 7 source points. Thus, the source array may have 21 source points in total. It is noted that a different number of sub-array sets and/or source points per sub-array set may be used.

FIG. 5 illustrates the exemplary embodiment of FIG. 4 as seen by an observer on the vessel watching from the bow to the stern of the vessel. Three floats 52a to 52c are shown in this figure. Each float is connected to a corresponding sub-array 60a to 60c of individual source points 64. Each sub-array includes a first depth sub-array set 54a and a second depth sub-array set 56a. The first depth sub-array set 54a is provided at the first depth z1 while the second depth sub-array set 56a is provided below the first depth sub-array set, with a larger depth z2.

In one application, the first and second depths sub-array sets for each float are identical, i.e., have a same number of source points 64. In another application, a number of source points 64 is higher for the first depth sub-array set than for the second depth sub-array set (e. g., 5 versus 2). In still another application, a distance d (along vertical axis z) between source points 64 in the first and second depths sub-array sets is larger than 1.5 m so that the seismic waves produced by the source points from different sub-array sets do not coalesce (i.e., for an observer situated under water, away from the source points, the seismic waves produced by two source points appear as different waves). The distance of 1.5 m is used as an example and those skilled in the art would appreciate that the distance may change as a function of the volume of the guns, firing pressure, etc. According to another exemplary embodiment, a ratio "r" of depths z2 and z1 (see FIG. 4) is around 1.5 for preventing the waves emitted by the source points 64 to coalesce. In other words, the depth z1 of the shallow source points of the sub-array set 54 multiplied by the ratio r is equal to the depth z2 of the source points of the sub-array set 56. It has been observed that if the ratio r is substantially 1.5, the spectrum of the seismic source is balanced and the waves emitted by the source points do not coalesce.

Figure 1:
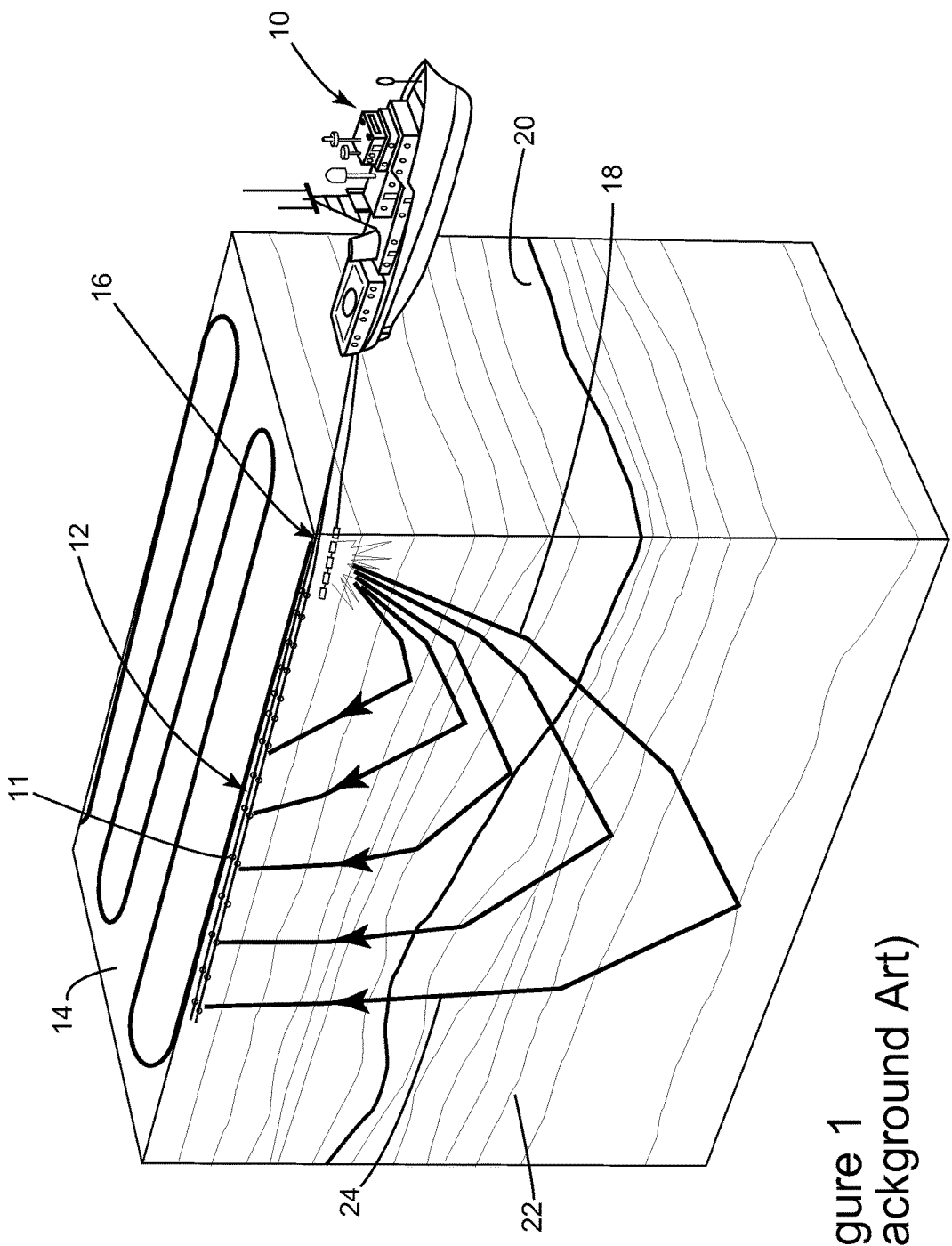
FIG. 1 is a schematic diagram of a conventional seismic survey system.
Figure 2:
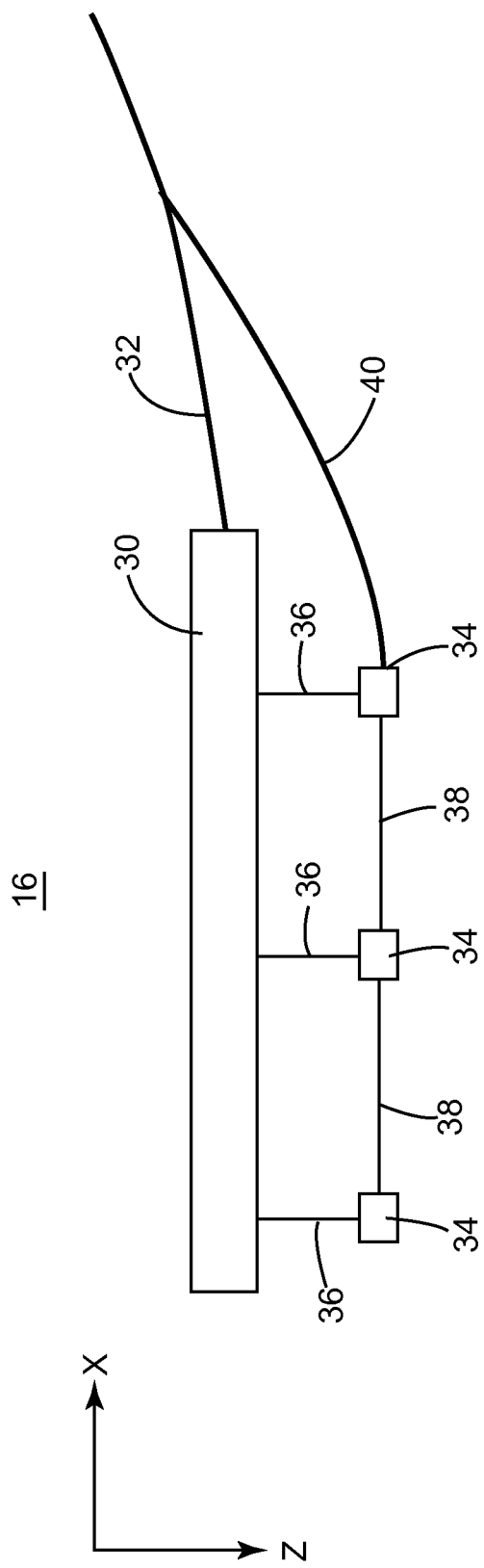
FIG. 2 is a schematic diagram of a float having a set of sources at a same depth.
Figure 3:
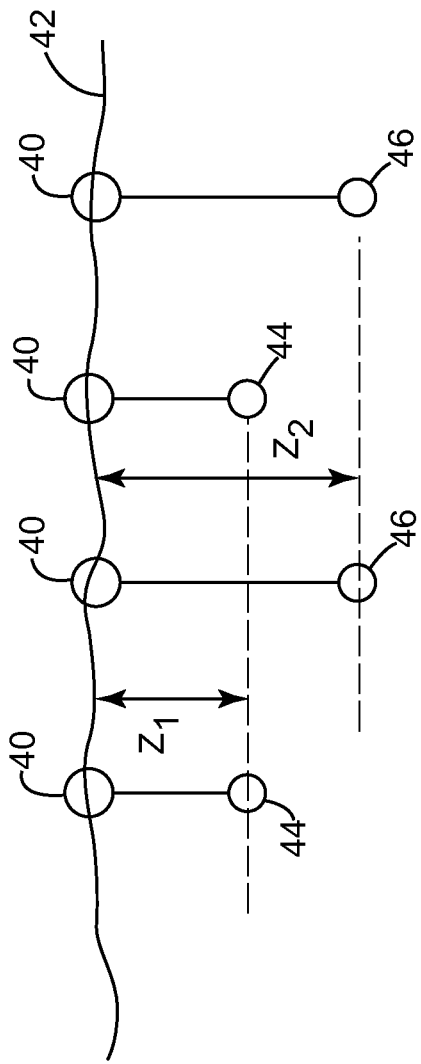
FIG. 3 is a schematic diagram of plural floats each having a set of sources at a predetermined single depth.
Figure 6B:
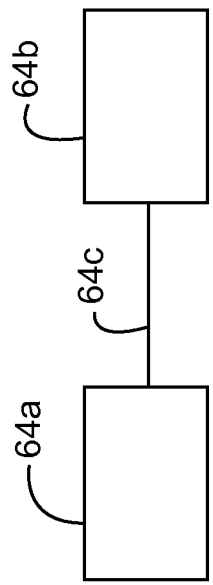
FIGS. 6A and B are schematic diagrams of single or cluster sources.
Figure 6A:
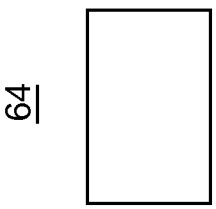

A common feature of the embodiments shown in FIGS. 4 and 5 is that all the source points 64 of the first and second depths sub-array sets (of a same source sub-array) are suspended from the same float, which is different from the conventional source arrays in which different floats are used for different depths of the source points, as shown in FIG. 3. The source points 64 shown in FIG. 5 may include one or more wave producing devices that actually are capable of generating a seismic wave. For example, a source point 64 may include a single device (e.g., air gun) for generating the seismic wave or two or more devices tied together, each device generating its own seismic wave. However, if multiple devices are provided together as a source point, a distance between these multiple devices is so chosen that their waves coalesce. FIG. 6a shows a single independent source point 64 (airgun, vibrational source, etc.) that is configured to generate a seismic wave while FIG. 6b shows two independent source points 64a and 64b connected to each other by a mechanical link 64c. In this case, the mechanical link 64c is employed to maintain a relative distance between the sources and each of the source points 64a and 64b is configured to generate its own seismic wave. The mechanical link 64c may be configured to be shorter than 1.5 m so that the waves emitted by source points 64a and 64b coalesce and appear as a single seismic wave.

Returning to FIG. 5, the first depth sub-array set 54a is shown having 2 source points 64 and the second depth sub-array set 56a is shown having 1 source point 64. The number of source points 64 shown in this figure is exemplary and not intended to limit the embodiments. As noted above, one setup employs 5 source points for the first depth sub-array set and 2 source points for the second sub-array set. Depending on the needs, it is possible to place the 7 source points 64 linked to the float 52a on three or more depth levels. More or less than 7 source points may be used.

Figure 7:
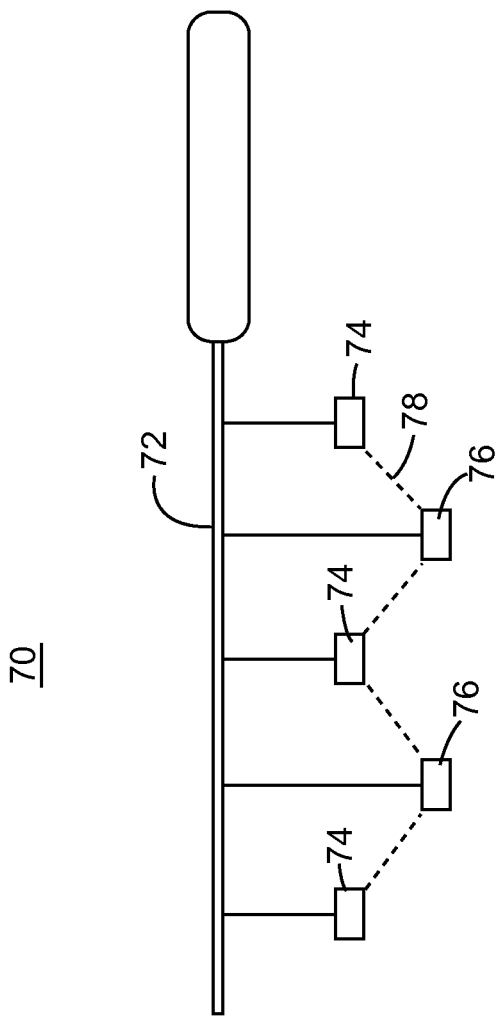
FIG. 7 is a schematic diagram of a float connected to two sets of sources distributed at two different depths according to an exemplary embodiment.

Another possible implementation is illustrated in FIG. 7 in which a source array 70 includes a float 72 from which source points 74 of the first depth sub-array set and source points 76 of the second depth sub-array set are directly suspended from the float. Optionally, links 78 may connect these source points one to the other for fixing their relative positions during firing. Further, it is noted in the exemplary embodiment of FIG. 7 that the source points of the second depth sub-array set are not vertically aligned within the source points of the first depth sub-array set.

The embodiments discussed above and further embodiments to be discussed not only achieve a shorter distance along an inline direction (direction X along the float) and increase the directivity of the source (as will be shown later), but also attenuate the ghost effect. Before presenting some simulated results for the novel source array and a reference source array, other embodiments of the novel source array are discussed next.

Figure 8A:
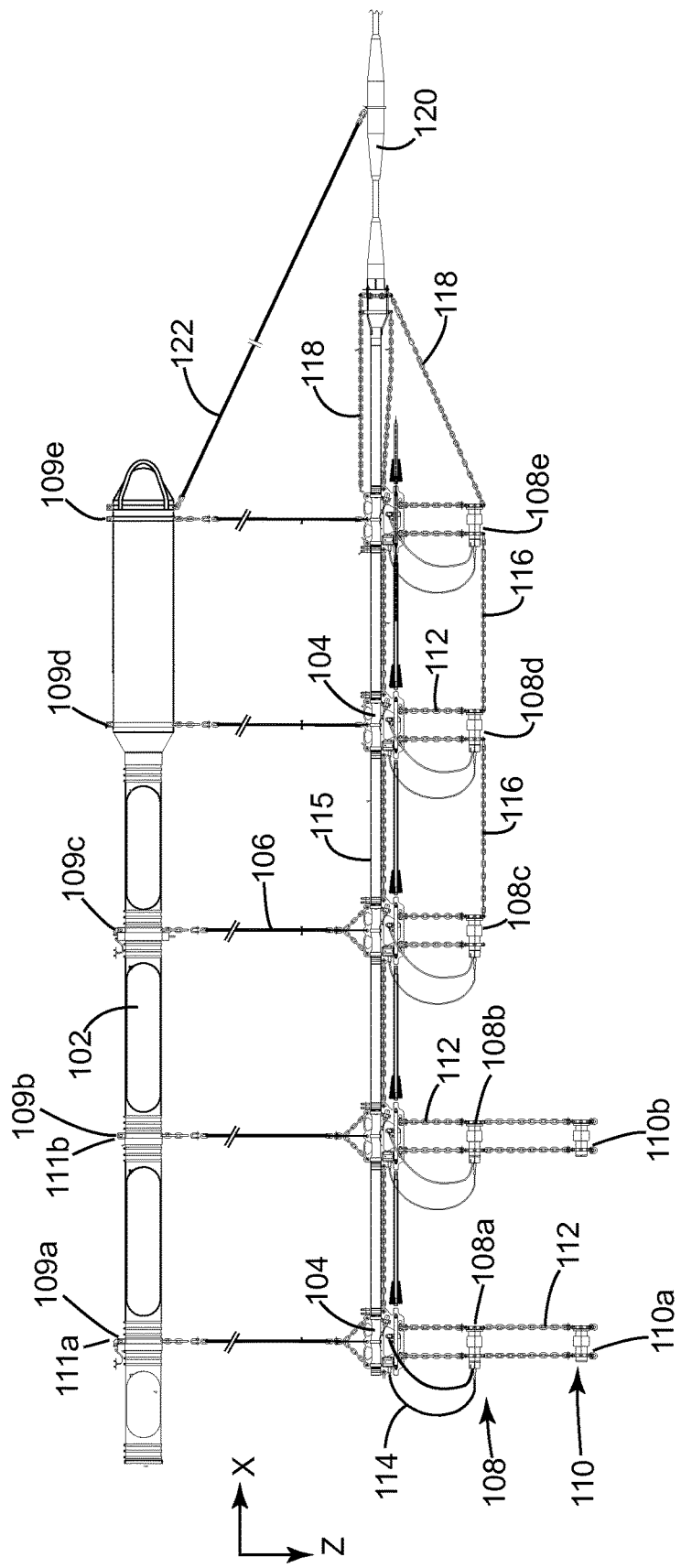
FIGS. 8A-C are schematic diagrams of a float having two source sub-array sets according to exemplary embodiments.

According to an exemplary embodiment shown in FIG. 8A, a source array 100A includes a float 102 from which multiple plates 104 are suspended at a given depth. In one application, there is a plate 104 for each point source. In another application, there is a single plate 104 for all point sources. The float 102 has a body that extends along a longitudinal axis (X). Although the exemplary embodiments discussed herein show a straight line float, it is noted that other shapes may be used for the float, e.g., circle, ellipse, etc. Cables 106 may be used to suspend the plates 104 from the float 102. It is noted that the cables 106 and the plates 104 are optional. Plural source points 108a to 108e form the first depth sub-array set 108 and plural source points 110a and 110b form the second depth sub-array set 110. All these source points are suspended from the same float 102 via links 112 that substantially extend on a vertical axis (Z). Each source point may have its own cables 114 (electrical, compressed air, data, etc.) for controlling the point source and activating the point source (it is noted that these cables are not shown for all the sources). The cables are protected by a housing 115. The plural source points 108a-e are suspended at various corresponding first locations 109a-e along the longitudinal axis X and the plural source points 110a-b are suspended at various corresponding second locations 111a-b along the longitudinal axis. The second locations 111a-b correspond to some of the first locations 109a-e in this embodiment. In another exemplary embodiment, the first locations 109a-e share no common X value with the second locations 111a-b.

Some of the source points may optionally be connected to each other by various means 116, e.g., rods, chains, cables, etc. A front portion of the plate 104 and the first source point 108e also may be connected via a connection 118 to an umbilical 120 that may connected to the vessel (not shown). Optionally, a link 122 may connect the float 102 to the umbilical 120. In one application, three or more of such floats 102 and corresponding source points may form the source array 100A.

Figure 8B:
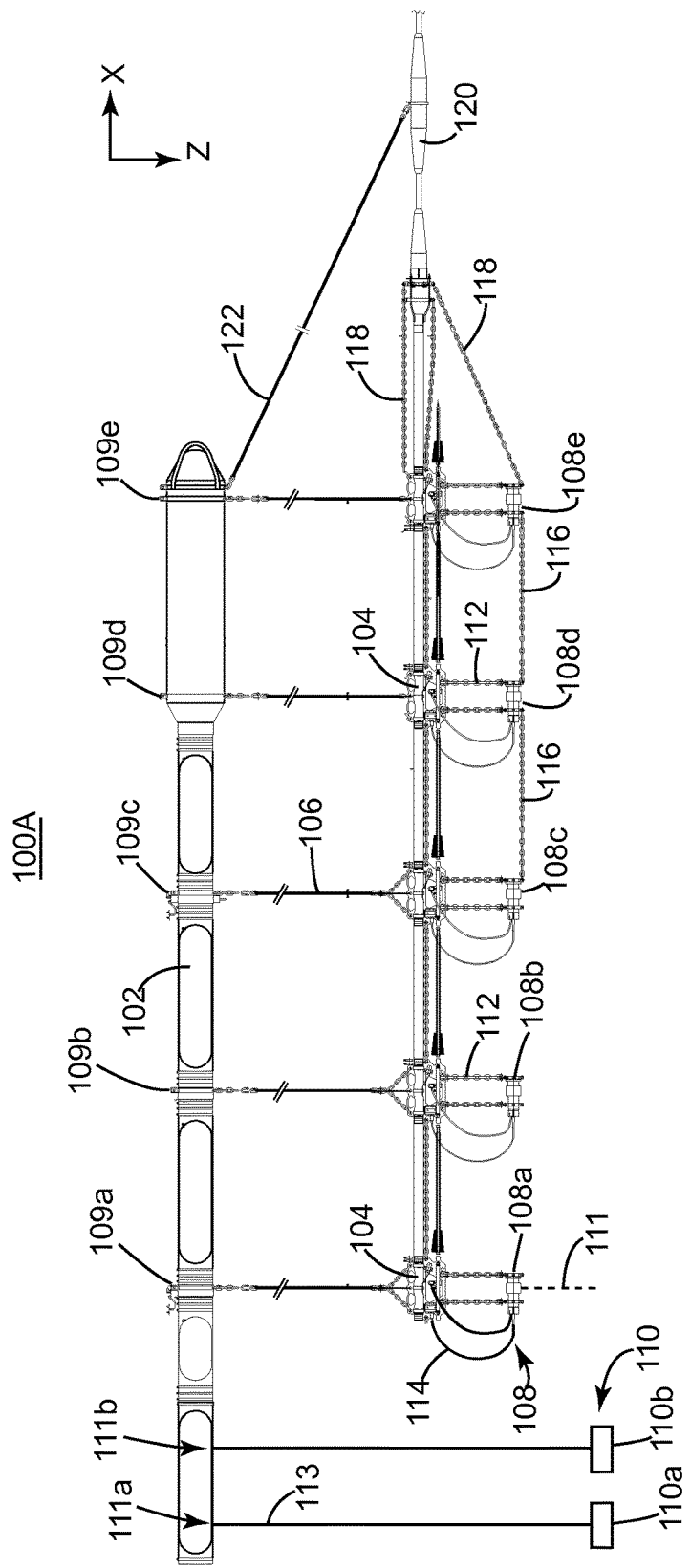

Another source 100B is shown in FIG. 8B, which is identical to the source shown in FIG. 8A except that there are no source points 108a and 108b directly above the source points 110a and 110b. In other words, only one point source (either from the first depth sub-array set 108 or from the second depth sub-array set 110) is present along a vertical line 111. In one exemplary embodiment, the above statement is true for any vertical line that intersects the float 102. In another words, the first source points have different locations along the X axis from the second source points. Further, the second source points 110a-b may be directly connected to the float 102 through corresponding cables 113. Alternatively, the second source points 110a-b may be connected to corresponding plates 104 (not shown but similar to those of the first source points) or to a single plate 104 as shown later in FIG. 8C. The electric and pneumatic cables for the second source points are not shown.

Figure 8C:
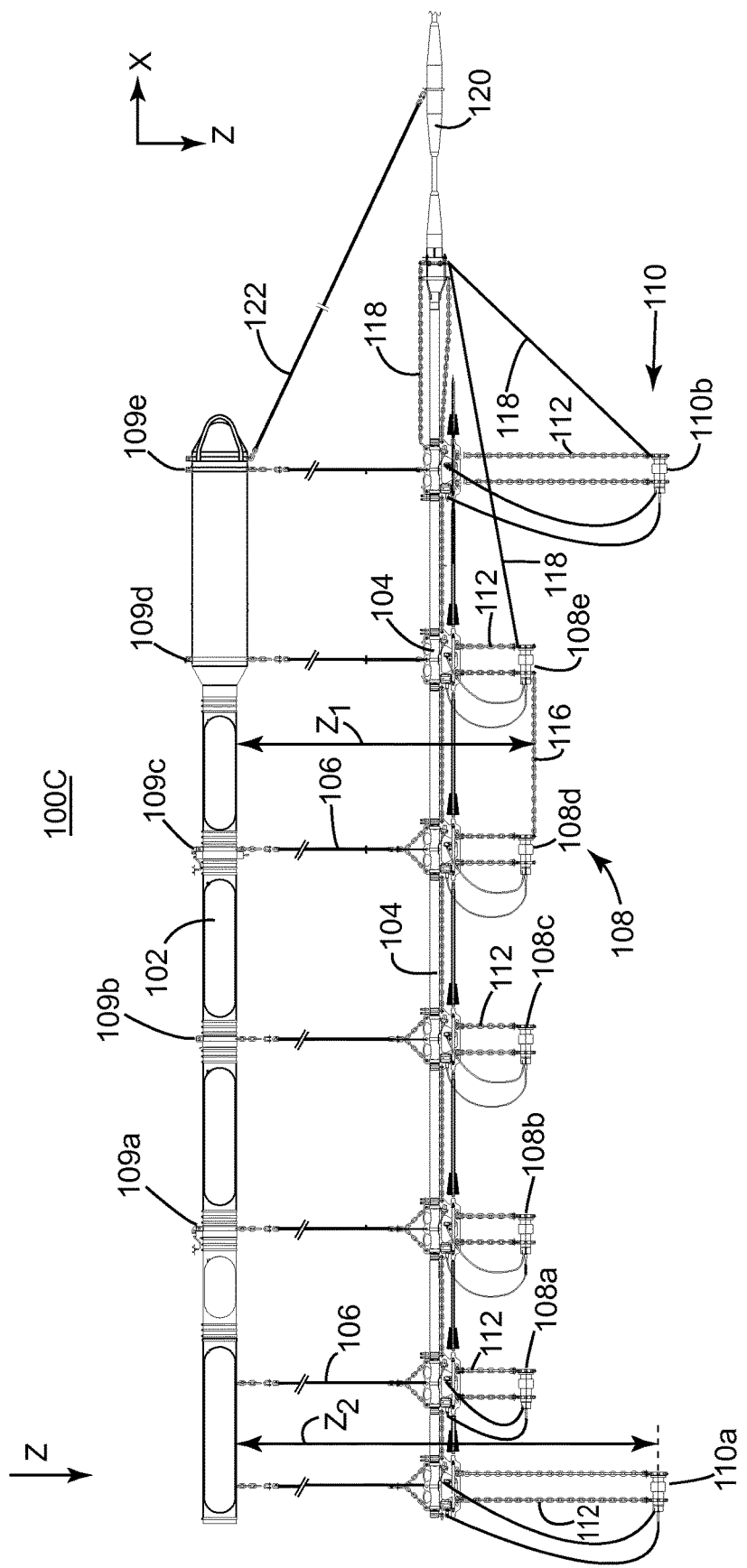

In still another exemplary embodiment, as illustrated in FIG. 8C, a source 100C includes source points 108a-e that are sandwiched between the source points 110a-b, with the source points 108a-e being provided at the first depth z1 and the source points 110a-b being provided at the second depth z2. For this embodiment, a plate 104 may be present for each source point or a single plate 104 may connect to all the source points.

Figure 9:
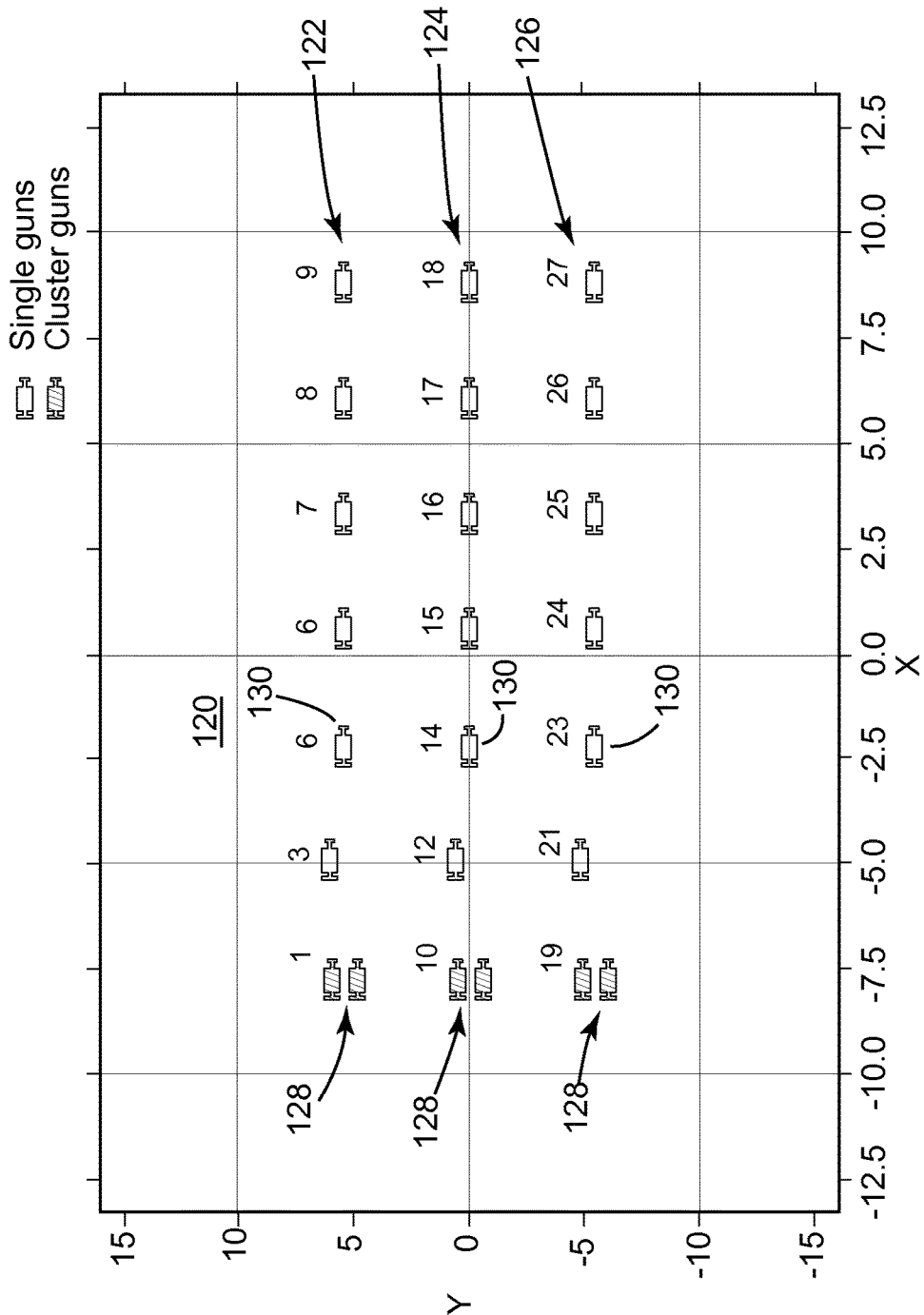
FIG. 9 is a schematic diagram of a reference source array.

Using specialized software typical for the industry, the directivity, the time signature and the amplitude spectrum of the novel source array and a reference source were calculated and they are discussed next. The set up of the reference source is illustrated in FIG. 9. This source array 120 is illustrated from a top view (i.e., an observer looking into the water along Z axis) and includes three sub-arrays 122, 124, and 126, each including 7 source points provided at the same depth. Source points 128 of each sub-array include cluster guns while the remaining source points 130 are single guns.

The novel source used for comparison is similar to that shown in FIG. 8A and includes a total number of three sub-arrays, each having 7 source points, thus a total number of 21 source points. The 7 source points are split into 5 source points provided in a first depth sub-array set at a first depth and 2 source points provided in a second depth sub-array set at a second depth.

Figure 10:
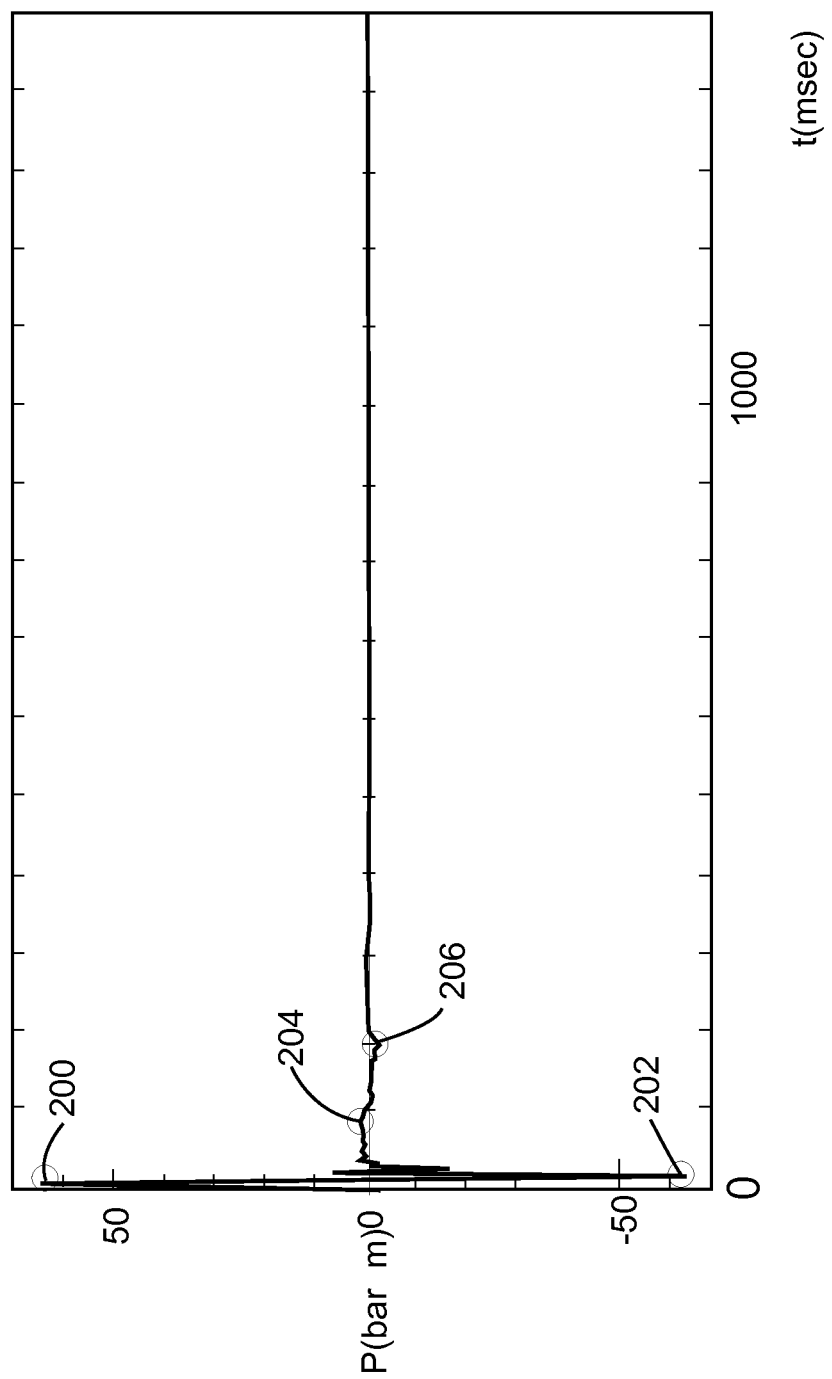
FIG. 10 is a time signature graph of the reference source array of FIG. 9.
Figure 11:
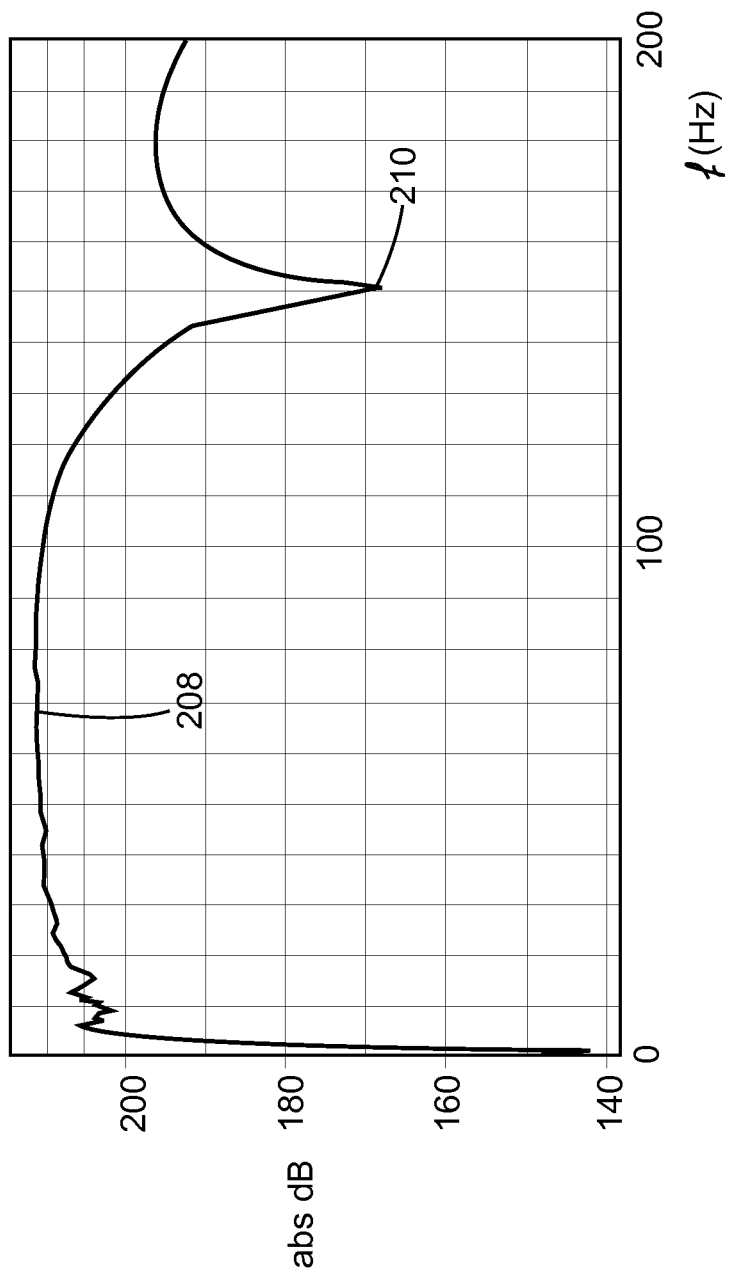
FIG. 11 is an amplitude spectrum of the reference source array of FIG. 9.

FIG. 10 shows a time signature (pressure versus time measured at the source array) of the traditional source array shown in FIG. 9 and FIG. 11 shows the amplitude spectrum of the same source array. It is noted in FIG. 10 that a first peak 200 and a second peak 202 after the source is fired are large. Also, it is noted the presence of the third and forth peaks 204 and 206, which is undesirable. FIG. 11 shows the amplitude spectrum 208 having a ghost notch 210 due to the ghost effect. An ideal time signature has only one peak while an ideal amplitude spectrum of a source array is as flat as possible without any notch.

Figure 12:
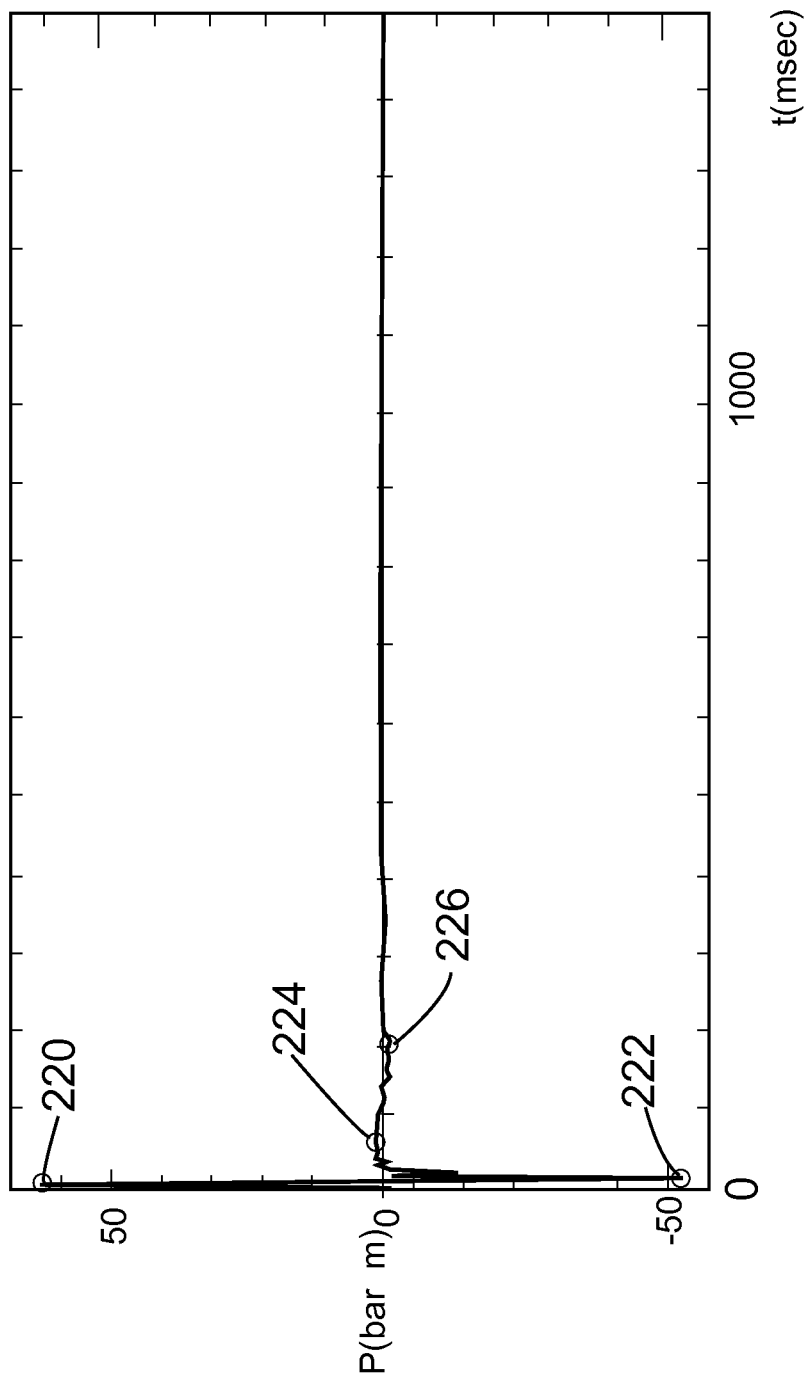
FIG. 12 is a time signature graph of a novel source array according to an exemplary embodiment.
Figure 13:
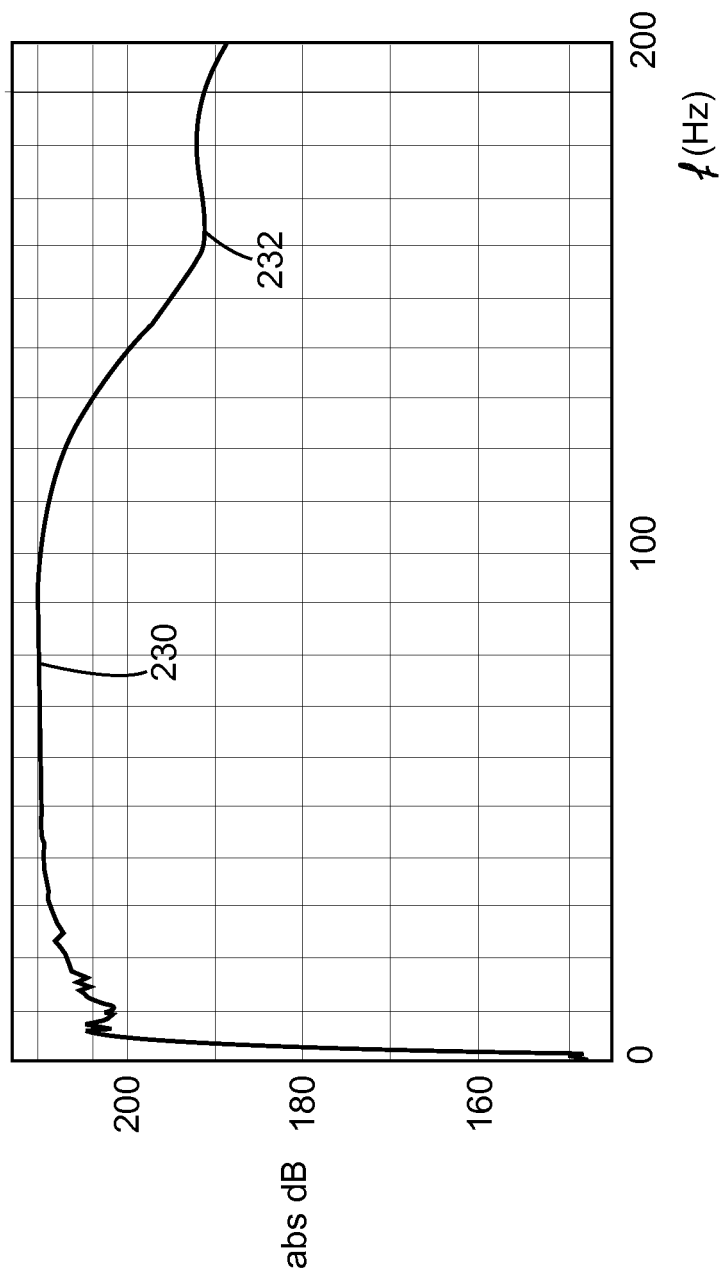
FIG. 13 is an amplitude spectrum of the novel source array according to an exemplary embodiment.
Figure 14:
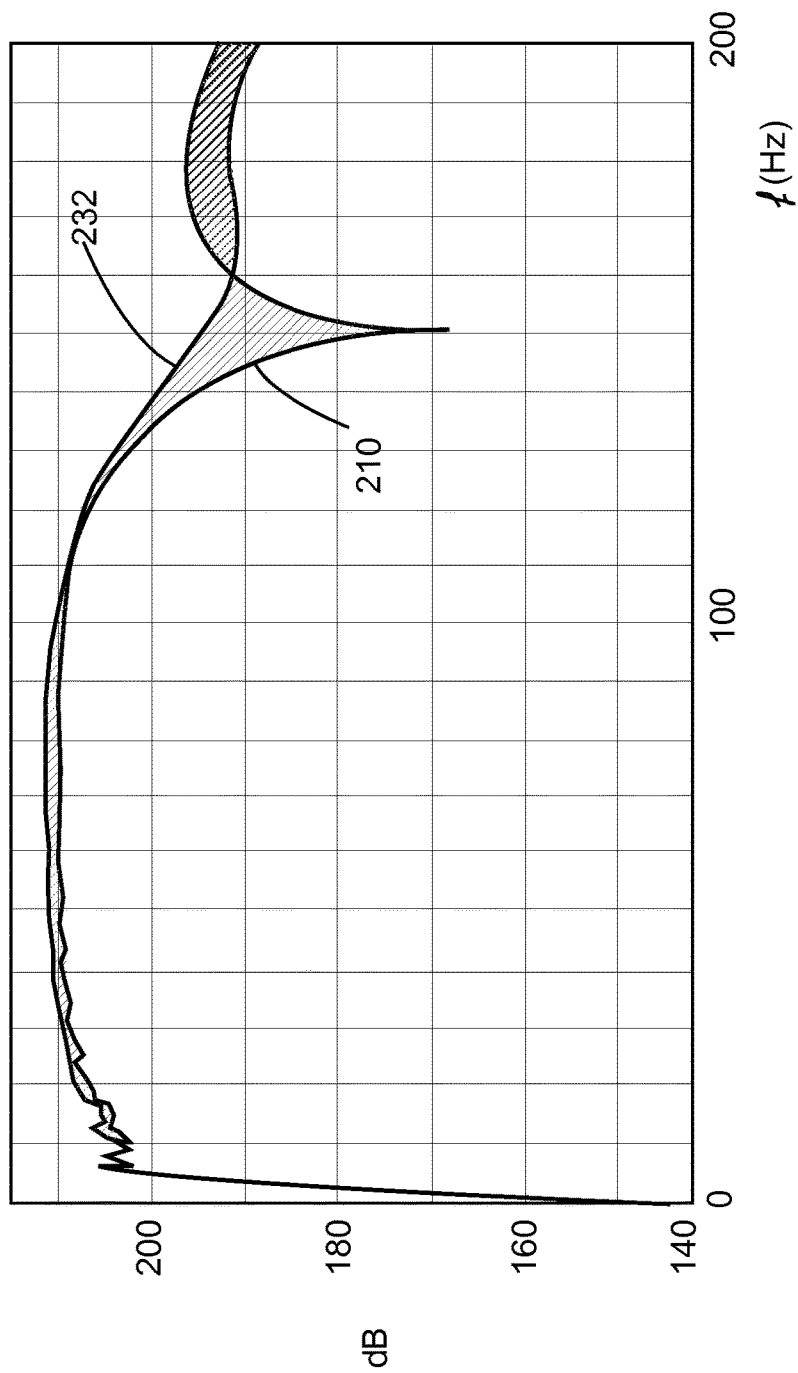
FIG. 14 is a comparison between the spectra of a reference source array and the novel source array.

FIG. 12 shows the time signature of the novel source array. It is noted, in comparison to FIG. 10, that the first peak 220 is maintained at a high value (as desired) while the secondary peaks 222, 224 and 226 have reduced amplitudes. Ideally, a perfect source array has only one peak. Thus, the time signature of the novel source array is improved compared to the traditional source array. Similar improvements are observed for the amplitude spectrum 230 in FIG. 13 for the novel source array. The ghost notch 232 is reduced comparative to the ghost notch 210 of the traditional source array shown in FIG. 11. For a better illustration of the improvement of the novel source array over the traditional source array, FIG. 14 shows the amplitude spectrum 210 of the traditional source array superimposed over the amplitude spectrum 232 of the novel source array.

Figure 15:
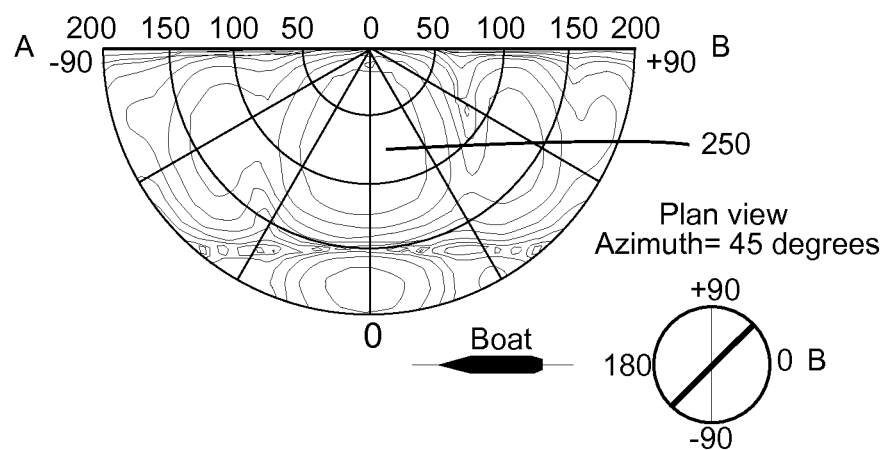
FIG. 15 is a source directivity plot for the reference source array.
Figure 16:
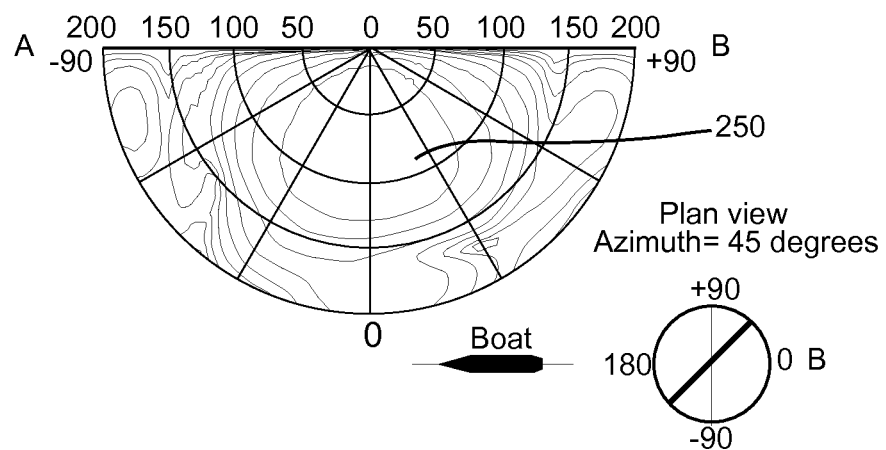
FIG. 16 is a source directivity plot for the novel source array.

Further improvements of the novel source array are observed when comparing the directivity of the traditional source array versus the novel source array in FIGS. 15 and 16. These figures plot a directivity of the sources having an azimuth angle of 45°. FIG. 15 illustrates the directivity of the traditional source array while FIG. 16 illustrates the directivity of the novel source array. It is noted that a main lobe 250 is larger for the novel source array, i.e., a uniformity of the generated seismic wave is better.

Figure 17:
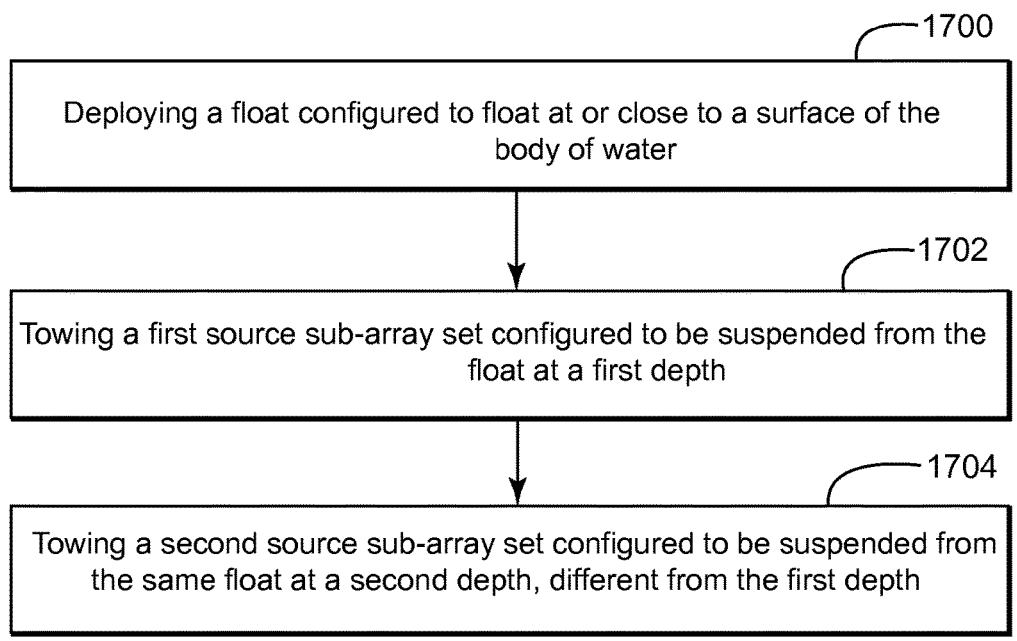
FIG. 17 is a flowchart of a method for towing a source array according to an exemplary embodiment.

According to an exemplary embodiment, a method for towing a marine seismic source array for generating a seismic wave in a body of water is now discussed with reference to FIG. 17. The method includes a step 1700 of deploying a float configured to float at or close to a surface of the body of water; a step 1702 of towing a first depth sub-array set configured to be suspended from the float at a first depth; and a step 1704 of towing a second depth sub-array set configured to be suspended from the same float at a second depth, different from the first depth. The first and second depths sub-array sets include source points that are vertically separated so that the waves produced by the source points do not coalesce.

One or more of the exemplary embodiments discussed above produces a more compact broadband source array while the source array suppresses a notch in the amplitude spectrum by having the individual source points provided at different depths relative to the surface of the water or the float. Also, the size of the source array is reduced by providing the predetermined number of individual source points at multiple depth levels instead along a straight line at a same depth. The size of the source array is reduced not only along the inline direction (direction along the streamers) but also along the cross-line direction (direction perpendicular to the streamers) by having plural source points distributed at different depths suspended from the same float. Further, existing floats may be used for the novel source array with minimal modifications. The existing floats do not have to be straight float but may be of other type as known in the art, e.g., floats used with the fan source or tower source.

The disclosed exemplary embodiments provide a system and a method for providing a compact broadband source array. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A single marine acoustic source array for generating an acoustic wave in a body of water, the single marine acoustic source array comprising:
    a float that extends along a longitudinal axis (X);
    a first depth sub-array set suspended from the float at a first depth (z1), wherein the first depth sub-array set includes first acoustic source points distributed at first locations along the longitudinal axis (X); and
    a second depth sub-array set suspended from the same float at a second depth (z2), different from the first depth, wherein the second depth sub-array set includes second acoustic source points distributed at second locations along the longitudinal axis (X),
    wherein at least one second location is different from each of the first locations.

2. The marine acoustic source array of claim 1, wherein the float has a front end facing a towing vessel and a back end opposite to the front end, and the first locations are closer to the front end than the second locations.

3. The marine acoustic source array of claim 1, wherein the float has a front end facing a towing vessel and a back end opposite to the front end, and one of the second locations is closest to the front end of the float and another one of the second locations is the furthest from the front end.

4. The marine acoustic source array of claim 1, wherein a number of the first acoustic source points of the first depth sub-array set is larger than a number of the second acoustic source points of the second depth sub-array set.

5. The marine acoustic source array of claim 1, further comprising:
    plural plates suspended from the float, wherein each source point of the first and second depth sub-array sets are directly suspended from a corresponding plate through links.

6. The marine acoustic source array of claim 1, wherein a ratio between the second depth and the first depth is about 1.5.

7. The marine acoustic source array of claim 1, wherein each source point of the second depth sub-array set is connected through cables to the float.

8. The marine acoustic source array of claim 1, wherein there are three first depth sub-array sets and three second depth sub-array sets.

9. The marine acoustic source array of claim 1, wherein the first depth sub-array set includes five source points and the second depth sub-array set includes two source points.

10. The marine acoustic source array of claim 1, wherein the float is a single float made of one or more elements.

11. The marine acoustic source array of claim 1, wherein source points of the first depth sub-array set are provided at a distance of at least 1.5 m from source points of the second depth sub-array set, along a direction perpendicular to the float, so that acoustic waves from the first depth sub-array set do not coalesce with acoustic waves from the second depth sub-array set.

12. The marine acoustic source array of claim 1, wherein the acoustic source points are airguns or vibration sources.

13. A marine acoustic source array for generating an acoustic wave in a body of water, the marine acoustic source array comprising:
    a first depth sub-array set of first acoustic source points provided at a first depth (z1), the first acoustic source points having inline first locations along a longitudinal axis (X); and
    a second depth sub-array set of second acoustic source points provided at a second depth (z2), the second acoustic source points having inline second locations along the longitudinal axis (X),
    wherein at least one inline second location is different from each of the inline first locations and at least one another inline second location is the same with one of the inline first locations, and
    wherein the first and second depth sub-array sets form a single marine acoustic source array.

14. The marine acoustic source array of claim 13, further comprising:
    a float configured to float at or close to a surface of the body of water, wherein the float extends along the longitudinal axis (X),
    wherein the float has a front end facing a towing vessel and a back end opposite to the front end, and the first locations are closer to the front end than the second locations.

15. The marine acoustic source array of claim 13, further comprising:
    a float configured to float at or close to a surface of the body of water, wherein the float extends along the longitudinal axis (X),
    wherein the float has a front end facing a towing vessel and a back end opposite to the front end, and one of the second locations is closest to the front end of the float and another one of the second locations is the furthest from the front end.

16. The marine acoustic source array of claim 13, wherein a number of the first acoustic source points of the first depth sub-array set is larger than a number of the second acoustic source points of the second depth sub-array set.

17. The marine acoustic source array of claim 13, wherein there are three first depth sub-array sets and three second depth sub-array sets.

18. The marine acoustic source array of claim 13, wherein source points of the first depth sub-array set are provided at a distance of at least 1.5 m from source points of the second depth sub-array set, along a direction perpendicular to the float, so that acoustic waves from the first depth sub-array set do not coalesce with acoustic waves from the second depth sub-array set.

19. A method for towing a single marine acoustic source array for generating an acoustic wave in a body of water, the method comprising:
    deploying a float configured to float at or close to a surface of the body of water;
    towing a first depth sub-array set having first acoustic source points suspended from the float at a first depth; and
    towing a second depth sub-array set having second acoustic source points suspended from the same float at a second depth, different from the first depth,
    wherein the first acoustic source points are connected to the float at inline first positions, the second acoustic source points are connected to the float at inline second position, and at least one inline second location is different from each of the inline first locations.

20. The method of claim 19, further comprising:
towing all the source points of the first and second depth sub-array sets while suspended from the same float.

* * * * *